(12) United States Patent
Han et al.

(10) Patent No.: US 11,501,539 B2
(45) Date of Patent: Nov. 15, 2022

(54) VEHICLE CONTROL SYSTEM, SENSING DEVICE AND SENSING DATA PROCESSING METHOD

(71) Applicant: HL KLEMOVE CORP., Incheon (KR)

(72) Inventors: Jae Hyun Han, Seoul (KR); OhCheol Heo, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 181 days.

(21) Appl. No.: 16/900,865

(22) Filed: Jun. 12, 2020

(65) Prior Publication Data

US 2020/0394424 A1  Dec. 17, 2020

(30) Foreign Application Priority Data

Jun. 14, 2019  (KR) .................. 10-2019-0070434

(51) Int. Cl.
  *G06K 9/00*  (2022.01)
  *B60W 40/04*  (2006.01)
  *B60W 30/095*  (2012.01)
  *G06V 20/58*  (2022.01)

(52) U.S. Cl.
  CPC ......... *G06V 20/58* (2022.01); *B60W 30/0956* (2013.01); *B60W 40/04* (2013.01); *B60W 2420/42* (2013.01)

(58) Field of Classification Search
  CPC .. G06V 20/58; B60W 30/0956; B60W 40/04; B60W 2420/42
  See application file for complete search history.

(56) References Cited

U.S. PATENT DOCUMENTS

| 5,955,967 | A | 9/1999 | Yamada |
| 10,703,362 | B2 * | 7/2020 | Maura .................. B60W 30/12 |
| 10,759,427 | B2 * | 9/2020 | Ide .................. B60W 60/00276 |
| 2019/0304105 | A1 * | 10/2019 | Gao ...................... G06K 9/6269 |
| 2019/0347820 | A1 * | 11/2019 | Golinsky ............... G01C 21/32 |

FOREIGN PATENT DOCUMENTS

| JP | 2017-56783 | 3/2017 |
| KR | 10-1826628 | 2/2018 |

* cited by examiner

*Primary Examiner* — Peter D Nolan
*Assistant Examiner* — Demetra R Smith-Stewart
(74) *Attorney, Agent, or Firm* — Ladas & Parry, LLP

(57) ABSTRACT

The present disclosure relates to a vehicle control system, a sensing device and a sensing data processing method. In particular, the sensing device according to the present disclosure may include an information receiver for receiving at least one of driving route information of a vehicle and lane information, a control target selector for presetting at least one of a filter condition and a tracking condition based on the received information, and selecting a control target among one or more objects existing in front of the vehicle based on at least one of the filter condition and the tracking condition, and an output for capturing and outputting a sensing data including a control target information for the control target.

19 Claims, 12 Drawing Sheets

VEHICLE CONTROL SYSTEM, SENSING DEVICE AND SENSING DATA PROCESSING METHOD

CROSS REFERENCE TO RELATED APPLICATION

This application claims priority from Korean Patent Application No. 10-2019-0070434, filed on Jun. 14, 2019, which is hereby incorporated by reference for all purposes as if fully set forth herein.

BACKGROUND OF THE INVENTION

1. Field of the Invention

The present disclosure relates to a vehicle control system, a sensing device and a sensing data processing method.

2. Description of the Prior Art

In recent years, as the demand for vehicle performance as well as the demand for convenience and safety of the driver increase, the research and development for a driver assistance system (DAS) assisting control of the vehicle based on information obtained through a sensor mounted on the vehicle for an autonomous driving have been actively conducted.

Vehicles capable of autonomous driving can perform the autonomous driving by using the advanced driver assistance systems (ADAS) such as an adaptive cruise control (ACC) or smart cruise control (SCC) and an autonomous emergency braking (AEB).

As basic components of ADAS for autonomous driving, various sensors and control devices can be used. Particularly, the function of the sensor capable of detecting an object may be important in order to perform more efficient and accurate ADAS function. In particular, radar sensors may be widely used in that they can detect objects, measure distance to objects, and relative speed.

In the case of the adaptive cruise control (ACC) system, a controller included in the ACC system may select a control target in consideration of whether a preceding vehicle existing in front of the vehicle is located on a driving route of the vehicle. At this time, the controller may calculate the lateral position of the object relative to the vehicle using the measurement value of the lateral position received from the radar sensor, and may select the corresponding object as the control target if the calculated lateral position of the object is smaller than a preset reference value.

Therefore, the performance of the radar sensor is important, and due to the deterioration of the performance of the radar sensor depending on the driving environment, there may be a problem in that the corresponding object existing in front of the vehicle cannot be selected as the control target, or another object existing in an adjacent road may be incorrectly recognized as the control target.

SUMMARY OF THE INVENTION

For this background, an object of the present disclosure is to provide the vehicle control system, sensing device, and sensing data processing method capable of continuously selecting and maintaining targets existing on the driving route of the vehicle or controlling not to select other targets driving on a side road.

In addition, another object of the present disclosure is to provide the vehicle control system, sensing device, and sensing data processing method capable of accurately recognizing the preceding target existing in the driving lane of the vehicle as the control target.

In accordance with an aspect of the present disclosure, there is provided a vehicle control system comprising: a first sensor disposed in the vehicle to have a field of view for inside or outside of the vehicle, configured to capture image data and process the captured image data; at least one second sensor disposed in the vehicle to have a detection area for the inside or outside of the vehicle, configured to capture sensing data and process the captured sensing data; and a controller configured to recognize a control target existing in front of the vehicle as a preceding target based at least in part on the processing of the image data and the sensing data, wherein the first sensor outputs at least one of driving route information and lane information of the vehicle included in a result of processing the image data to the second sensor, and wherein the second sensor includes an information receiver for receiving at least one of the driving route information and the lane information of the vehicle; a control target selector for presetting at least one of a filter condition and a tracking condition based on the received information, and selecting a control target among one or more objects existing in front of the vehicle based on at least one of the filter condition and the tracking condition; and an output for capturing and outputting the sensing data including a control target information for the control target.

In accordance with another aspect of the present disclosure, there is provided a sensing device comprising: an information receiver for receiving at least one of driving route information of a vehicle and lane information; a control target selector for presetting at least one of a filter condition and a tracking condition based on the received information, and selecting a control target among one or more objects existing in front of the vehicle based on at least one of the filter condition and the tracking condition; and an output for capturing and outputting a sensing data including a control target information for the control target.

In accordance with another aspect of the present disclosure, there is provided a sensing data processing method comprising: receiving at least one of a driving route information and a lane information of a vehicle; presetting at least one of a filter condition and a tracking condition based on the received information, and selecting a control target among one or more objects existing in front of the vehicle based on at least one of the filter condition and the tracking condition; and capturing and outputting the sensing data including a control target information for the control target.

According to the present disclosure, the present disclosure can provide the vehicle control system, sensing device, and sensing data processing method capable of continuously selecting and maintaining targets existing on the driving route of the vehicle or controlling not to select other targets driving on the adjacent road.

In addition, according to the present disclosure, the present disclosure can provide the vehicle control system, sensing device, and sensing data processing method capable of accurately recognizing the preceding target existing in the driving lane of the vehicle as the control target.

DETAILED DESCRIPTION OF THE EXEMPLARY EMBODIMENTS

Figure 1:
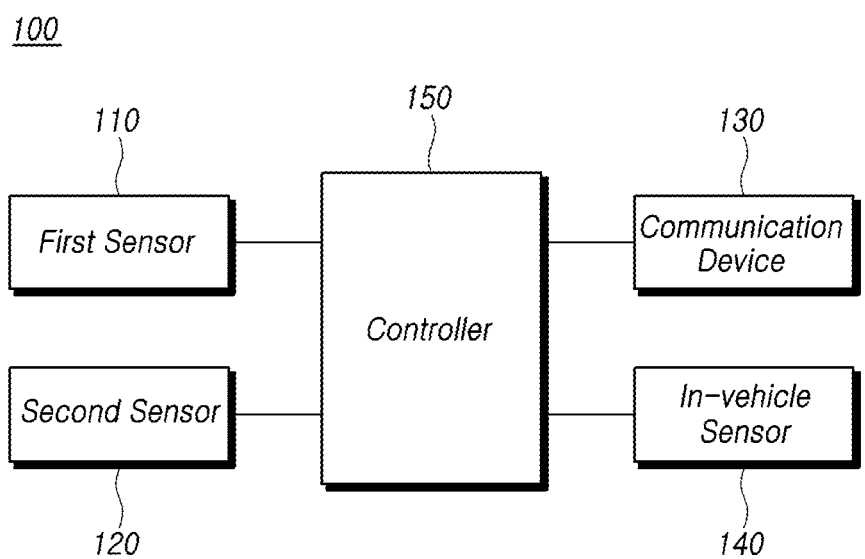
FIG. 1 is a block diagram illustrating an embodiment of the vehicle control system according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

FIG. 1 is a block diagram illustrating an embodiment of the vehicle control system 100 according to the present disclosure.

Referring to FIG. 1, the vehicle control system 100 according to the present disclosure may include a first sensor 110, a second sensor 120, a communication device 130, an in-vehicle sensor 140, and a controller 150. Here, the first sensor is an example expression, the first sensor may include a camera sensor, and hereinafter, the first sensor and camera sensor may be used together in the same sense.

For example, the camera sensor 110 may include an image sensor which is disposed to have a field of view for the inside or outside of the vehicle and captures image data, and a processor for processing the captured image data.

As an example, the image sensor may be disposed in the vehicle to have the field of view for the inside or outside of the vehicle. In order to have the field of view for the front, side, or rear of the vehicle, at least one image sensors may be mounted on each part of the vehicle.

Since image information captured from the image sensor is composed of image data, the image data in this specification may mean image data captured from an image sensor. Hereinafter, the image information captured from the image sensor in the present disclosure means image data captured from the image sensor. The image data captured by the image sensor may be generated, for example, in one of AVI format in a raw form, MPEG-4, H.264, DivX, and JPEG formats.

The image data captured by the image sensor can be processed by the processor. The processor may be operative to process image data captured by the image sensor.

The processor may be implemented, in hardware, by using at least one of electrical units capable of processing image data and other functions, such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, and the like.

The camera sensor 110 may output at least one of the driving route information and the lane information of the vehicle included in the result of processing the image data to the non-image sensor 120.

Here, the driving route information of the vehicle may mean information about a road on which the vehicle is currently driving or an estimated driving route of the vehicle, and the lane information may mean a boundary line between a lane (or road) on which the vehicle is driving and an adjacent lane.

Here, the second sensor is an example expression, the second sensor may include a non-image sensor, and hereinafter, the second sensor, sensing device and non-image sensor may be used together in the same sense.

The non-image sensor 120 means other sensor modules except for the camera sensor 110 for capturing the image. For example, the plurality of non-image sensors 120 may be disposed in the vehicle to have the detection area for the inside or outside of the vehicle to capture the sensing data. Examples of the plurality of non-image sensors 120 may include a radar (RADAR) sensor, a lidar (LIDAR) sensor, and an ultrasonic sensor. The non-image sensor 120 may not be provided, or may be provided with one or more.

In the case that the non-image sensor 120 is the ultrasonic sensor, the ultrasonic sensor may include an ultrasonic transmitter, a receiver, and a processor. The ultrasonic sensor can detect an object based on the transmitted ultrasonic waves and detect a distance and a relative speed from the detected object. If the object is a stationary object (e.g., street trees, street lights, traffic lights, traffic signs, etc.), the ultrasonic sensor may detect the distance between the vehicle and the object and the driving speed of the vehicle based on the time of flight (TOF) by the object of the transmission signal.

The communication device 130 may perform functions such as communication between the vehicle and the vehicle, communication between the vehicle and the infrastructure, communication between the vehicle and the server, and communication inside the vehicle. To this end, the communication device 130 may include a transmitting module and a receiving module. For example, the communication device 130 may include a broadcast receiving module, a wireless internet module, a near field communication module, a location information module, an optical communication module, and a V2X communication module.

The broadcast receiving module may receive a broadcast signal or broadcast-related information from an external broadcast management server through a broadcast channel. Here, the broadcast includes at least one of radio broadcast and TV broadcast.

The wireless internet module refers to a module for wireless internet access, and may be built in or external to a vehicle. The near field communication module is for near field communication, and may be used to support the near field communication based on at least one of Bluetooth™, Radio Frequency Identification (RFID), Infrared Data Association (IrDA), Ultra-Wideband (UWB), ZigBee, Near Field Communication(NFC), Wireless-Fidelity(Wi-Fi), Wi-Fi Direct, and Wireless Universal Serial Bus (Wireless USB) technology.

The location information module may be a module for obtaining location information of a vehicle, and a representative example thereof is a Global Positioning System (GPS) module. For example, if the vehicle uses a GPS module, the location of the vehicle can be obtained using a signal transmitted from a GPS satellite. Meanwhile, according to an embodiment, the location information module may be a component included in the in-vehicle sensor 140 rather than a component included in the communication device 130.

The optical communication module may include an optical transmitter and an optical receiver. The optical transmitter and the optical receiver may convert optical signals into electrical signals to transmit and receive information.

The V2X communication module is a module for performing wireless communication with a server or other vehicles, infrastructure devices, and the like. The V2X communication module in this embodiment may mean that a vehicle exchanges information with other vehicles, mobile devices, roads, etc. through wired/wireless networks, or the technology therefor. V2X communication may include the vehicle-to-vehicle (V2V) communication, the vehicle-to-infrastructure (V2I) communication, the vehicle-to-nomadic device (V2N) communication, the vehicle-to-pedestrian (V2P) communication. V2X communication module may be based on the dedicated short-range communications (DSRC), and may utilize the WAVE (Wireless Access in Vehicular Environment) communication technology or IEEE 802.11p communication technology using the 5.9 GHz band recently conducted by the American Institute of Electrical and Electronic Engineers (IEEE). However, it is not limited thereto, and it should be understood that the V2X communication module can utilize all inter-vehicle communication to be developed at present or in the future.

The in-vehicle sensor 140 may be a sensor for sensing or detecting various states of a vehicle. For example, the in-vehicle sensor 140 may include the torque sensor for sensing steering torque, the steering angle sensor for sensing steering angle, the motor position sensor for sensing information about the steering motor, the vehicle speed sensor, and a vehicle motion detection sensor for sensing the movement of the vehicle, the vehicle attitude detection sensor, and the like. In addition, the in-vehicle sensor 140 may be configured with one or more sensors for sensing various data inside the vehicle. Here, the steering torque may be a torque generated by the driver operating the steering wheel.

The controller 150 may acquire data from at least one of the camera sensor 110, the non-image sensor 120, the communication device 130, and the in-vehicle sensor 140, and may control various operation of the vehicle based on the acquired data. Alternatively, the controller 150 may perform a function of processing image data obtained from the camera sensor 110. Also, the controller 150 may receive sensing data from the non-image sensor 120 and process the received sensing data. Alternatively, the controller 150 may acquire data from the in-vehicle sensor 140 or the communication device 130 and process the acquired data. For such processing, the controller 150 may include at least one processor.

The controller 150 may be implemented using an electronic controller unit (ECU), a micro controller unit (MCU), or the like.

The vehicle control system according to the present disclosure may be implemented by combining the above-described configurations as necessary. For example, the vehicle control system according to an embodiment may include the camera sensor 110, the non-image sensor 120 and the controller 150. The vehicle control system according to another embodiment may include only the camera sensor 110 and the controller 150. According to another embodiment, the vehicle control system may include the non-image sensor 120 and the controller 150. However, it is not limited to these embodiments.

In particular, the vehicle control system 100 may include the camera sensor 110 disposed in the vehicle to have a field of view for inside or outside of the vehicle, configured to capture image data and process the captured image data, at least one non-image sensor module 120 disposed in the vehicle to have a detection area for the inside or outside of the vehicle, configured to capture sensing data and process the captured sensing data, and the controller 150 configured to recognize the control target existing in front of the vehicle as the preceding target based at least in part on the processing of the image data and the sensing data.

The camera sensor 110 may output at least one of the driving route information and the lane information of the vehicle included in the result of processing the image data to the non-image sensor 120.

The non-image sensor 120 may select the control target among one or more objects existing in front of the vehicle and capture and output sensing data including control target information. That is, the non-image sensor 120 may capture the control target so that the selected control target is included in the sensing data and may output control target information including information related to the selected control target.

Here, the control target may mean an object selected to be recognized by the controller 150 as the preceding target. In addition, the control target information may be included in sensing data captured by the non-image sensor 120. The method of selecting the control target will be described later with reference to FIGS. 3 to 11.

In addition, the controller 150 may control the operation of at least one of the camera sensor 110, the non-image sensor 120, the communication device 130, and the in-vehicle sensor 140. In addition, the controller 150 may control the operation of various driver assistance systems configured in the vehicle.

The domain control unit (DCU) may be implemented to perform all functions including the function of the controller 150, the function as a processor for processing the image data and sensing data, and the function to control the vehicle by outputting control signals to the steering control module, braking control module and ADAS (Adaptive Driving Assistance System) module.

The ADAS module may mean a module that implements the functions of several driver assistance systems, and the driver assistance system may be, for example, a smart parking assistance system (SPAS), a blind spot detection (BSD) system, adaptive cruise control (ACC) system, lane departure warning system (LDWS), lane keeping assist system (LKAS), lane change assist (LCAS) System, or the like. However, it is not limited thereto.

Information, signals, and the like may be transmitted and received between the components of the vehicle control system 100 described above through a controller area network (CAN).

Figure 2:
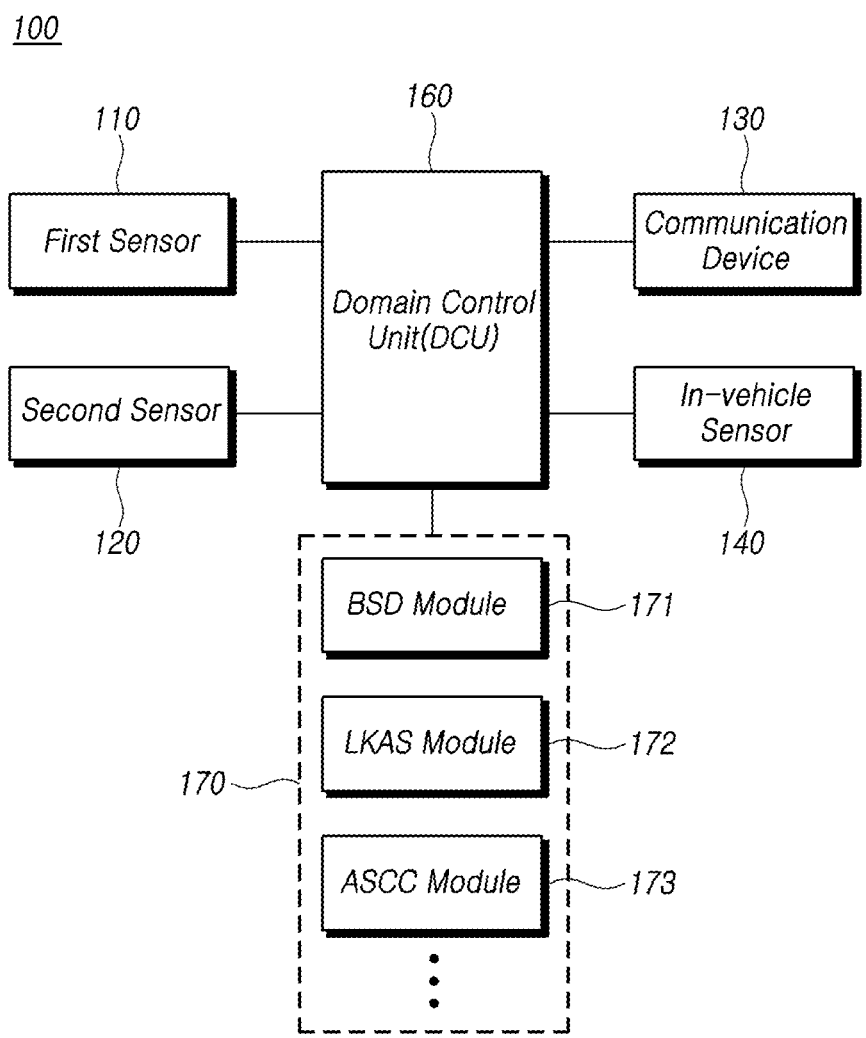
FIG. 2 is a block diagram illustrating another embodiment of the vehicle control system according to the present disclosure.

FIG. 2 is a block diagram illustrating another embodiment of the vehicle control system according to the present disclosure.

Referring to FIG. 2, the vehicle control system 100 according to the present disclosure may include at least one of the camera sensor 110, the non-image sensor 120, the communication device 130 and the in-vehicle sensor 140. Description of these components has been described with reference to FIG. 1 and will be omitted.

In addition, the vehicle control system may include the domain control unit 160.

The domain control unit (DCU, 160) may receive the captured image data from at least one image sensor, may receive the captured sensing data from a plurality of non-image sensors, and may be configured to process at least one of the image data and the sensing data. For this processing, the domain control unit 160 may include at least one processor.

Alternatively, the domain control unit 160 may transmit and receive data with at least one module of the camera sensor 110, the non-image sensor 120, the communication device 130, the in-vehicle sensor 140, and the driver assistance system module 170, and may process data received therefrom. That is, the domain control unit 160 may communicate with at least one module provided in the vehicle or mounted in the vehicle. To this end, the domain control unit 160 may further include the appropriate data link or communication link, such as the vehicle network bus for data transmission or signal communication.

The domain control unit 160 may operate to control one or more of various driver assistance systems (DAS) used in the vehicle. For example, the domain control unit 160 may determine the occurrence of the specific situation, condition, or event, or may perform the control operation for one or more of the driver assistance system (DAS) based on data obtained from at least one of the camera sensor 110, non-image sensor 120, communication device 130, vehicle interior sensor module 140 and driver assistance system module 170.

The domain control unit 160 may generate and transmit signals for controlling the operation of various driver assistance system modules 170 in the vehicle by using information determined based on data obtained from the these modules. For example, the driver assistance system module 170 may include the blind spot detection (BSD) system module 171, a lane keeping assistance system (LKAS) module 172, an adaptive smart cruise control (ASCC) system module 173, and the like.

Furthermore, the driver assistance system module 170 configured in the vehicle may further include the lane departure warning system (LDWS), the lane change assistance system (LCAS), and the smart parking assistance system (SPAS).

The terms and expressions of the driver assistance system described herein are only illustratively disclosed, but are not limited thereto. Also, the driver assistance system module 170 may include an autonomous driving module for autonomous driving.

Alternatively, the domain control unit 160 may control the vehicle to perform autonomous driving through control of individual system modules included in the driver assistance system module 170.

As described above, the vehicle control system 100 according to the present disclosure may be implemented by combining the above-described configurations as necessary.

For example, the vehicle control system 100 may include the camera sensor 110 disposed in the vehicle to have a field of view for inside or outside of the vehicle, configured to capture image data, at least one non-image sensor 120 disposed in the vehicle to have a detection area for the inside or outside of the vehicle, configured to capture sensing data, the driver assistance system module 170 for controlling a driving speed of the vehicle such that the vehicle maintains the predetermined distance from the preceding target and travels at the target driving speed, and the domain control unit 160 configured to process the image data and the sensing data and control at least one driver assistance system module provided in the vehicle, The camera sensor 110 may output at least one of the driving route information and the lane information of the vehicle included in the result of processing the image data to the non-image sensor 120.

The non-image sensor 120 may select a control target from one or more objects existing in front of the vehicle, and capture and output sensing data including control target information.

The domain control unit 160 may control the driver assistance system module 170 to recognize the control target obtained by processing results of sensing data as the preceding target. Here, the driver assistance system module 170 may include, for example, an adaptive smart cruise control (ASCC) system module 173.

As described above in FIG. 1, each component of the vehicle control system 100 may transmit and receive information, signals, and the like through a controller area network (CAN).

Hereinafter, a method of selecting the control target necessary for recognition as the preceding target will be described.

Figure 3:
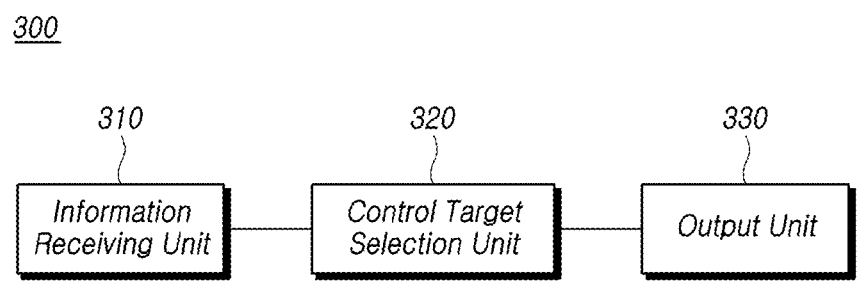
FIG. 3 is a block diagram illustrating the non-image sensor according to the present disclosure.

FIG. 3 is a block diagram illustrating the non-image sensor 300 according to the present disclosure.

Referring to FIG. 3, the non-image sensor 300 according to the present disclosure may include the information receiving unit 310, the control target selection unit 320, and the output unit 330. In the present specification, the information receiving unit 310, the control target selection unit 320, and the output unit 330 may be used in the same meaning as the information receiver, the control target selector, and the output, respectively.

The information receiving unit 310 may receive at least one of driving route information and lane information of the vehicle.

Specifically, the camera sensor 110 shown in FIG. 1 or 2 captures image data and outputs driving route information and lane information to the non-image sensor 300, and the information receiving unit 310 may receive the driving route information and lane information.

The control target selection unit 320 may set at least one of the filter condition and the tracking condition in advance based on the received information.

Here, the filter condition may mean the condition for removing or filtering the measurement values for objects existing outside the driving route of the vehicle or the driving lane in which the vehicle travels, among the measurement values sampled for objects existing around the vehicle.

The tracking condition may refer to the condition for updating the measurement value for the object existing in the driving route or the driving lane in order to output the measurement value sampled for the object as sensing data.

Details of the filter conditions and tracking conditions will be described later with reference to FIGS. 4 to 11.

The control target selection unit 320 may select the control target from one or more objects existing in front of the vehicle based on at least one of the filter condition and the tracking condition.

The output unit 330 may capture and output the sensing data including control target information.

Figure 4:
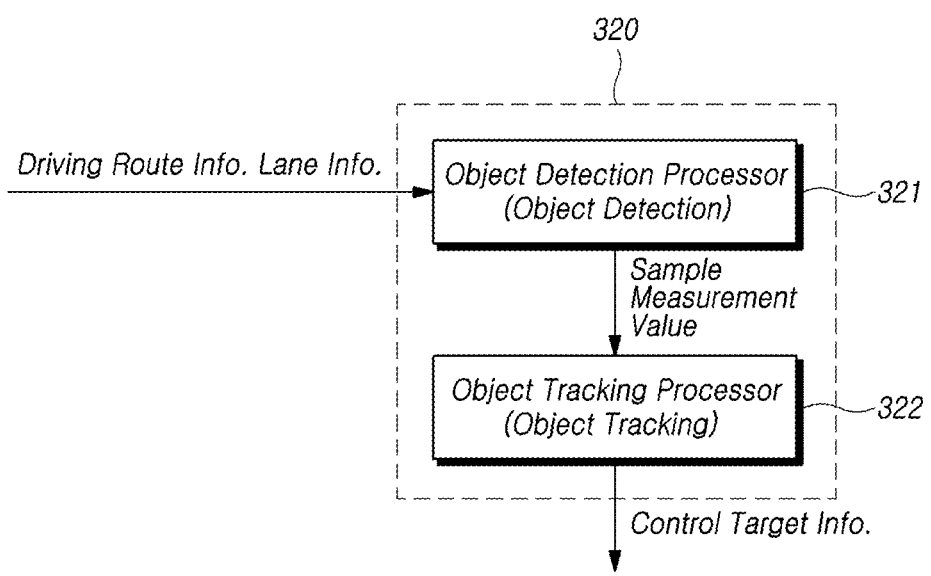
FIG. 4 is a diagram illustrating an embodiment of the control target selection unit included in the non-image sensor according to the present disclosure.

FIG. 4 is a diagram illustrating an embodiment of the control target selection unit 320 included in the non-image sensor 300 according to the present disclosure.

Referring to FIG. 4, the control target selection unit 320 according to the present disclosure may include the object detection processor 321 and the object tracking processor 322.

The object detection processor 321 may generate a sample measurement value for the object existing around the vehicle.

Here, the sample measurement value may be the sensing result obtained by sampling the object at a specific time, and may mean the sensing result obtained by measuring the state of an object's position, velocity, and acceleration.

The object tracking processor 322 may track the location of the real object by using the sample measurement value generated by the object detection processor 321 and output information about the result. For example, the object tracking processor 322 may track the position of the real object by updating the estimation values in the current state using sample measurement value and Kalman Filter, Alpha-Beta Filter, etc.

Here, the estimation value may mean a value obtained by estimating a state of an object's position, velocity, and acceleration at a specific time.

The control target selection unit 320 according to an embodiment of the present disclosure may generate the sample measurement value of an object, and may determine whether the sample measurement value is located in the driving route or the driving lane in which the vehicle is driving based on the filter condition.

For example, the object detection processor 321 may generate sample measurement value of the object. Then, the object detection processor 321 may receive the driving route information, the lane information in which the vehicle is running, and may check the sample measurement values located in the driving route or the lane in which the vehicle is running, among the sample measurement values.

In addition, the control target selection unit 320 may filter sample measurement values located outside the driving route or driving lane and select sample measurement values located within the driving route or the driving lane as the control target.

For example, the object detection processor 321 may filter or remove the sample measurement value located outside the driving route or driving lane. Then, the object detection processor 321 outputs the sample measurement value located in the driving route or the driving lane among the sample measurement values to the object tracking processor 322. The object tracking processor 322 tracks the sample measurement value by updating the estimation value in the current state using the Kalman filter, and selects the sample measurement value corresponding to the finally output update estimation value as the control target.

If the control target is selected, the control target selection unit 320 generates and outputs control target information.

Figure 5:
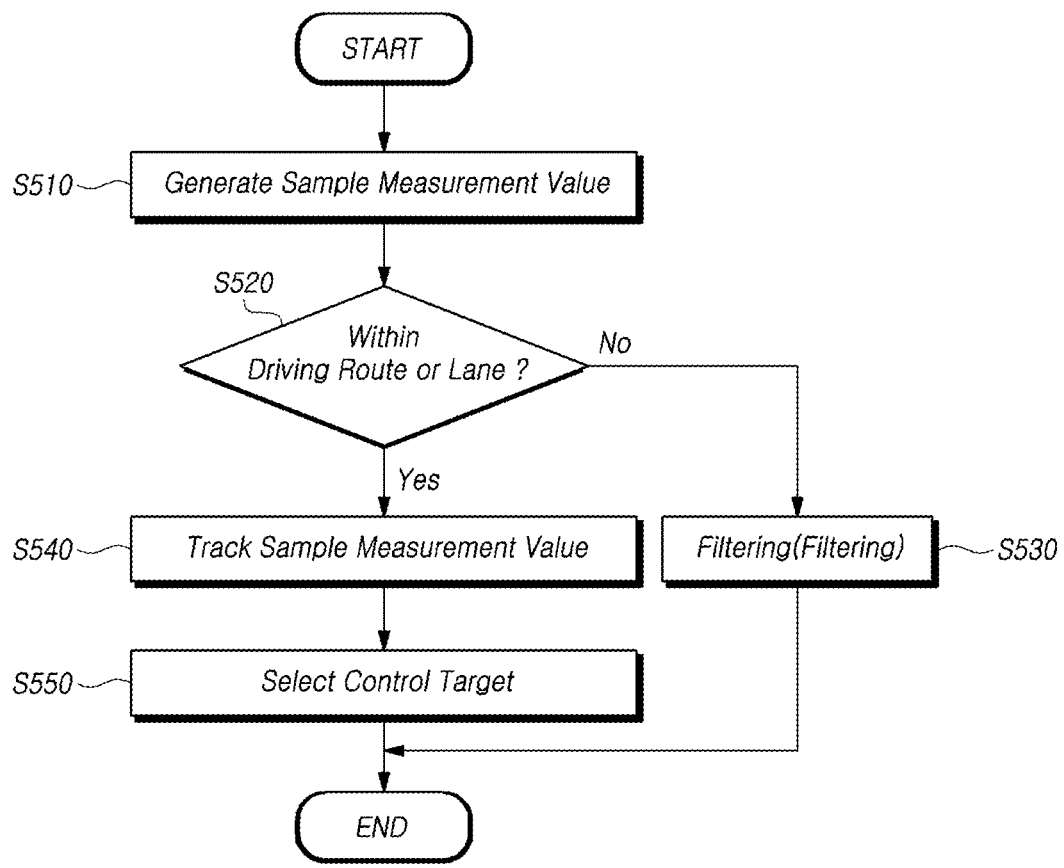
FIG. 5 is a flowchart illustrating an operation of an embodiment of the control target selection unit according to the present disclosure.

FIG. 5 is a flowchart illustrating an operation of an embodiment of the control target selection unit 320 according to the present disclosure.

Referring to FIG. 5, the control target selection unit 320 according to the present disclosure generates the sample measurement value of the object existing around the vehicle (S510).

For example, the object detection processor 321 generates sample measurement values of one or more objects present in front of the vehicle.

If the sample measurement value is generated, the control target selection unit 320 determines whether the sample measurement value is located in the driving route or the driving lane (S520).

For example, the object detection processor 321 receives the driving route information, the lane information in which the vehicle travels, and checks the sample measurement values located in the driving route or the driving lane among the sample measurement values.

If the sample measurement value is not located within the driving route or driving lane, the control target selection unit 320 filters the sample measurement value located outside the driving route or driving lane (S530).

For example, the object detection processor 321 removes the sample measurement value located outside the driving route or the driving lane.

If the sample measurement value is located in the driving route or the driving lane, the control target selection unit 320 tracks the sample measurement value based on the driving route or the driving lane (S540).

For example, the object tracking processor 322 updates the estimation value in the current state by using the Kalman filter in order to track the sample measurement value located within the driving route or driving lane.

The control target selection unit 320 selects a sample measurement value located in the driving route or the driving lane as the control target (S550).

Figure 6:
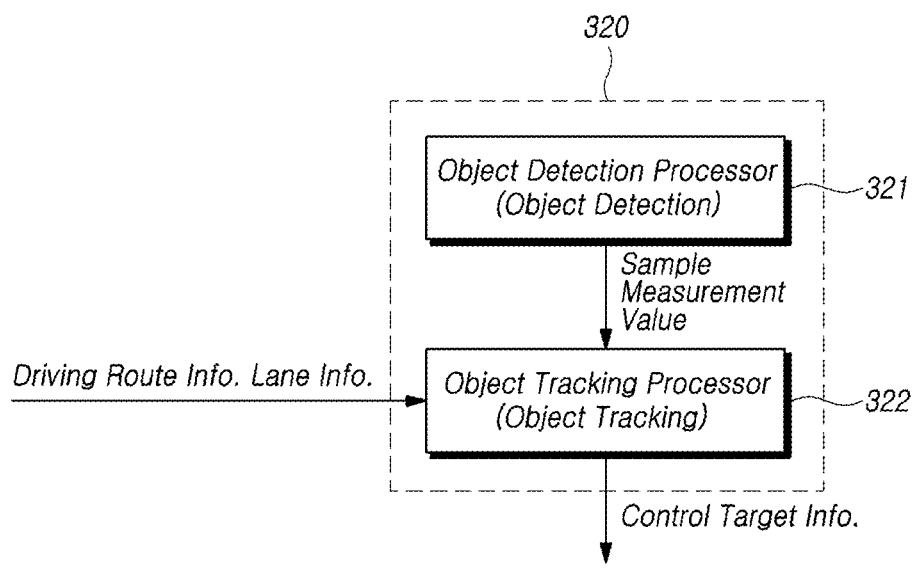
FIG. 6 is a diagram illustrating another embodiment of the control target selection unit included in the non-image sensor according to the present disclosure.

FIG. 6 is a diagram illustrating another embodiment of the control target selection unit 320 included in the non-image sensor 300 according to the present disclosure.

Referring to FIG. 6, the control target selection unit 320 according to the present disclosure may include the object detection processor 321 and the object tracking processor 322 as shown in FIG. 4. Description of these configurations has been described with reference to FIG. 4 and is therefore omitted.

Another embodiment of the control target selection unit 320 according to the present disclosure is different from the one embodiment illustrated in FIG. 4 in that the object tracking processor 322 uses the driving lane information and the lane information in which the vehicle travels.

Specifically, the control target selection unit 320 generates the sample measurement value of the object existing around the vehicle.

For example, the object detection processor 321 generates the sample measurement values of one or more objects present in front of the vehicle and outputs the sample measurement values to the object tracking processor 322.

Then, the control target selection unit 320, for example, the object tracking processor 322 may generate the tracking model that is movable to track the sample measurement value of the object.

Here, the tracking model may refer to a model for tracking sample measurement values using the Kalman filter, the alpha-beta filter, or the like.

The control target selection unit 320, for example, the object tracking processor 322, may update the tracking model for tracking the sample measurement value according to whether the sample measurement value exists in the driving route or the driving lane in which the vehicle is driving.

That is, if the sample measurement value is present in a driving route or the driving lane, the tracking model may be updated every sampling time so that the position of the tracking model is moved to the location of the sample measurement value in order to track the sample measurement value.

If the sample measurement value and the tracking model overlap more than a preset reference range for a preset reference time, the control target selection unit 320, for example, the object tracking processor 322 may select the object corresponding to the sample measurement value as the control target.

The control target selection unit 320, for example, the object tracking processor 322 may update the tracking model to track the sample measurement value if the sample measurement value is within the driving route or the driving lane, and may release the tracking of the tracking model for the sample measurement value or may limit the degree of update of the tracking model if the sample measurement value exists outside the driving route or the driving lane.

If the above is explained from the mathematical modeling point of view of the tracking model, the control target may be selected through the prediction part and the correction part.

Specifically, in the prediction part, the current estimation value in the current state of the object is calculated by the equation 1.

$$\hat{x}^-(t) = A\hat{x}(t-1) + Bu(t) \quad \text{[Equation 1]}$$

Here, $\hat{x}^-(t)$ is the current estimation value in the current state, $\hat{x}(t-1)$ is the update estimation value in the previous state, A is the state transition matrix of the system, B is the control input matrix, and u(t) is the control input.

At this time, Bu(t) may be removed from the equation 1 or a term for an error value may be added according to modeling of the entire system.

Then, in the correction part, the update estimation value in the current state may be calculated by updating the current estimation value by the equation 2.

$$\hat{x}(t) = \hat{x}^-(t) + wK(y(t) - \hat{x}^-(t)) \quad \text{[Equation 2]}$$

Here, $\hat{x}(t)$ is the update estimation value in the current state, w is the weight, K is the update gain, and y(t) is the sample measurement value of the object.

Here, the update gain may be any one of the Kalman gain by the Kalman filter and the alpha-beta gain by the alpha-beta filter, however, is not limited thereto.

Meanwhile, the difference between the sample measurement value and the current estimation value may be defined as the correction value, and the value generated by multiplying the correction value and the preset update gain may be defined as the parameter.

In addition, the update gain may be a variable that restricts tracking of sample measurement values by a tracking model described below or turns off tracking of the tracking model by adjusting a preset update gain.

In addition, by adjusting the preset update gain, tracking of sample measurement values by the tracking model described later may be restricted, or tracking of the tracking model may be released. Therefore, the update gain may be the parameter for limiting or releasing the tracking.

Here, the parameter applying the weight having a value of 1 may be the parameter that allows the tracking model to track sample measurement value.

For example, if the update estimation value is calculated by adding the parameter in which the weight is applied in the current estimation value, the object tracking processor 322 may select the object corresponding to the update estimation value as the control target.

Here, the parameter reflecting the weight of 0 or more and less than 1 may be the parameter that restricts the tracking model from tracking the sample measurement value. Particularly, the parameter reflecting the weight of 0 may be the parameter for releasing tracking of the tracking model.

For example, if the update estimation value is calculated by adding parameters applying weights of 0 or more and less than 1 in the current estimation value, the object tracking processor 322 may restrict the tracking model from tracking sample measurement value. Therefore, as described above, the sample measurement value and the tracking model cannot be overlapped during the reference time, so that the object corresponding to the sample measurement value is not selected as the control target.

In summary, the control target selection unit 320, for example, the object tracking processor 322 may generate the parameter $K(y(t) - \hat{x}^-(t))$ by multiplying the preset update gain K and the correction value $(y(t) - \hat{x}^-(t))$ calculated as the difference between the sample measurement value y(t) of the object and the current estimation value $\hat{x}^-(t)$ in a current state of the object.

In addition, the control target selection unit 320, for example, the object tracking processor 322 may calculate the update estimation value $\hat{x}(t)$ by updating the current estimation value $\hat{x}^-(t)$ by reflecting the parameter $K(y(t) - \hat{x}^-(t))$ in the current estimation value $\hat{x}^-(t)$, and may select the object corresponding to the first update estimation value $\hat{x}(t)$ calculated by reflecting the weight w of 1 to the parameter $K(y(t) - \hat{x}^-(t))$ as the control target if the sample measurement value y(t) exists in the driving route or the driving lane.

In addition, the control target selection unit 320, for example, the object tracking processor 322 may exclude the object corresponding to the second update estimation value $\hat{x}(t)$ calculated by reflecting the weight w of 0 or more and less than 1 to the parameter K(y(t)−x̂⁻(t)) from the control target if the sample measurement value y(t) exists outside the driving route or the driving lane.

In addition, the control target selection unit 320, for example, the object tracking processor 322 may exclude the object corresponding to the second update estimation value x̂(t) calculated by adjusting the update gain from the control target if the sample measurement value y(t) exists outside the driving route or the driving lane.

If the control target is selected, the control target selection unit 320, for example, the object tracking processor 322 may generate and output control target information for the selected control target.

Figure 7:
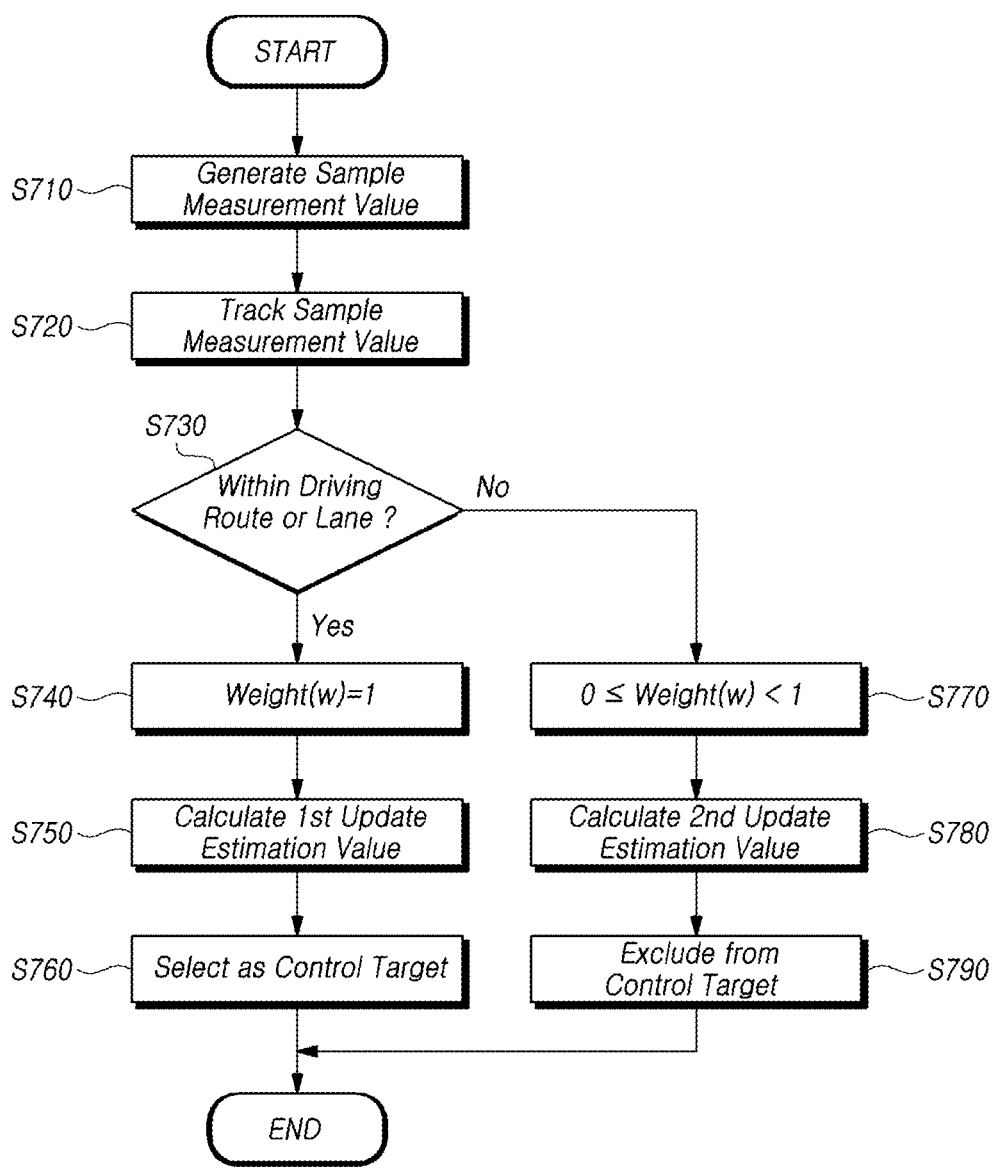
FIG. 7 is a flowchart illustrating an operation of another embodiment of the control target selection unit according to the present disclosure.

FIG. 7 is a flowchart illustrating an operation of another embodiment of the control target selection unit 320 according to the present disclosure.

Referring to FIG. 7, the control target selection unit 320 according to the present disclosure may generate the sample measurement value similar to that described above with reference to FIG. 5 (S710), may track the generated sample measurement value (S720), and may determine whether the generated sample measurement is located within the driving route or the driving lane (S730).

If the sample measurement value is located in the driving route or the lane, the control target selection unit 320 may determine the weight w as 1 (S740), may calculate the first update estimation value x̂(t) by reflecting the determined weight to the parameter (S750), and may select the sample measurement value corresponding to the first update estimation value x̂(t) and the object corresponding to the sample measurement value as the control target (S760).

Meanwhile, if the sample measurement value is not located in the driving route or the lane, the control target selection unit 320 may determine the weight w to a value of 0 or more and less than 1 (S770), may calculate the second update estimation value x̂(t) by reflecting the determined weight to the parameter (S780), and may exclude the sample measurement value corresponding to the second update estimation value x̂(t) and the object corresponding to the sample measurement value from the control target (S790).

Figure 8:
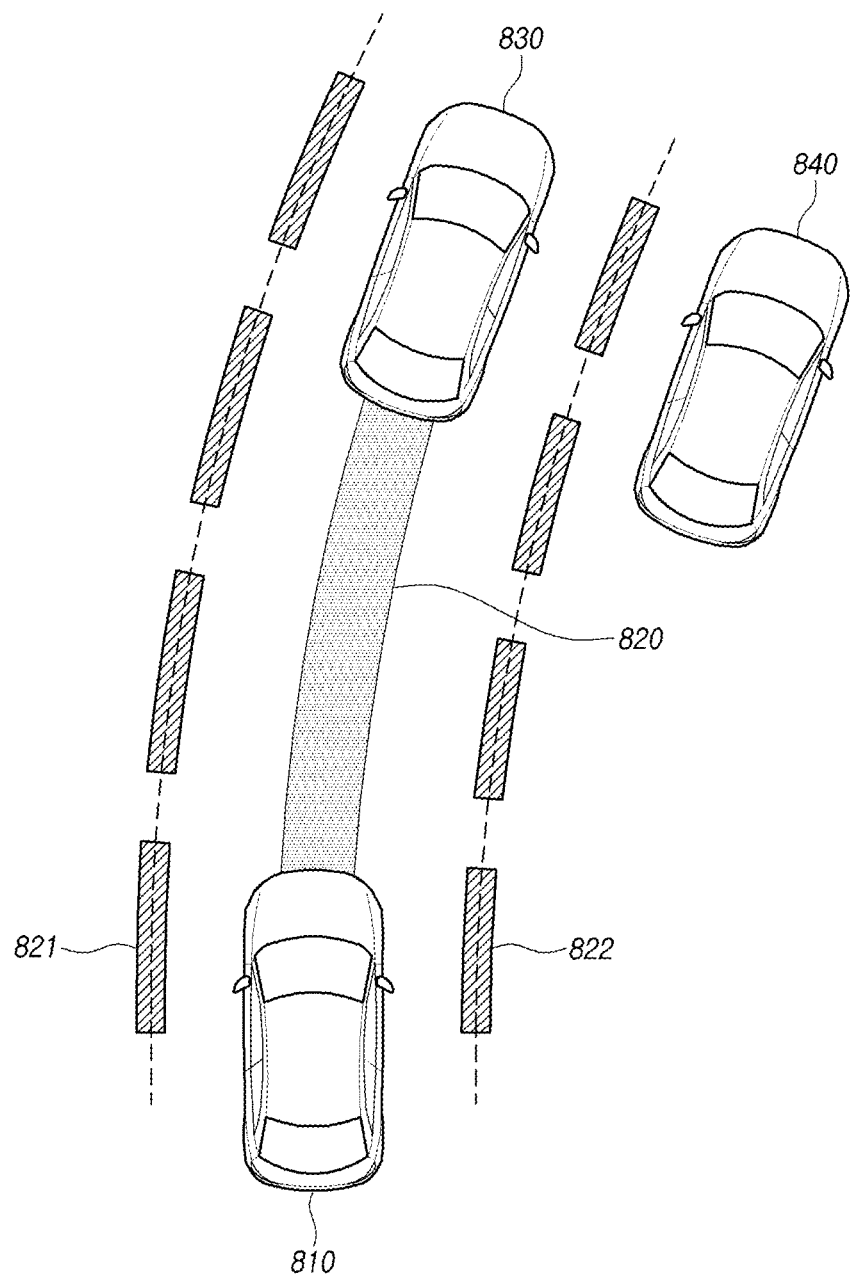
FIG. 8 is a diagram for exemplarily illustrating the vehicle that travels to follow a preceding target according to the present disclosure.
Figure 9:
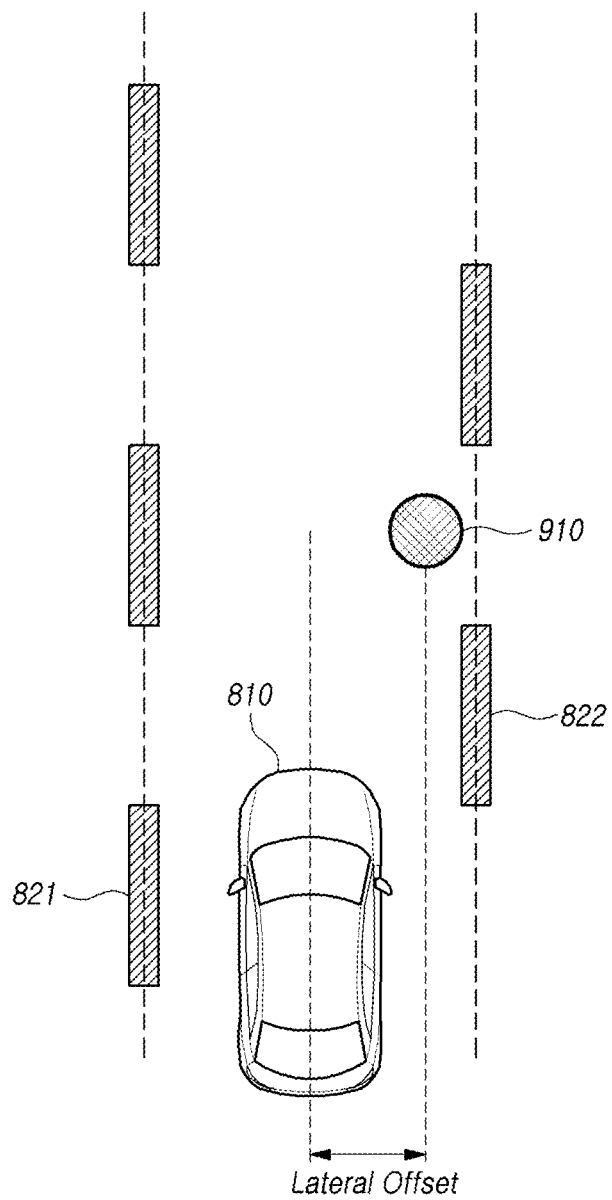
FIG. 9 is a diagram for explaining an embodiment of recognizing the preceding target according to the present disclosure.

FIG. 8 is a diagram for exemplarily illustrating the vehicle that travels to follow a preceding target according to the present disclosure, and FIG. 9 is a diagram for explaining an embodiment of recognizing the preceding target according to the present disclosure.

Referring to FIG. 8, the vehicle 810 according to the present disclosure is capable of driving in the driving route 820 while performing the function of the driver assistance system. For example, the vehicle 810 may perform the function of the adaptive cruise control (ACC) system to maintain the predetermined distance from the preceding target (eg, the preceding vehicle, 830) and may be capable of driving at the target driving speed.

At this case, in order to accurately perform the function of the adaptive cruise control (ACC) system, the vehicle control system 100 mounted on the vehicle 810 should accurately recognize the preceding target 830 existing on the driving route 820 of the vehicle 810. In addition, the vehicle control system 100 should exclude the adjacent target 840 traveling on the road adjacent to the driving route 820 of the vehicle 810 from the control target so that the adjacent target 840 is not recognized as the preceding target 830.

Referring to FIG. 9, the controller 150 included in the vehicle control system 100 mounted on the vehicle 810 may acquire lane information of the lanes 821 and 822 included in the image data captured by the camera sensor 110.

The controller 150 included in the vehicle control system 100 mounted on the vehicle 810 may acquire the lateral position information of the control target 810 by using the control target information for the control target 910 included in sensing data captured by the non-image sensor 120.

The controller 150 included in the vehicle control system 100 mounted on the vehicle 810 may calculate the lateral offset between the vehicle 810 and the control target 910 using the lateral position information of the control target 910.

If the lateral offset is smaller than the distance between the vehicle 810 and any one of the first lane 821 and the second lane 822, for example, the second lane 822, the controller 150 included in the vehicle control system 100 mounted on the vehicle 810 may recognize the control target 910 as the preceding target 830.

The above is also applied to the domain control unit 160.

As described above, an embodiment in which the control target selection unit 320 selects the control target 910 according to the present disclosure to distinguish the preceding target 830 from the adjacent target 840 will be described in the road driving situation.

Figure 10:
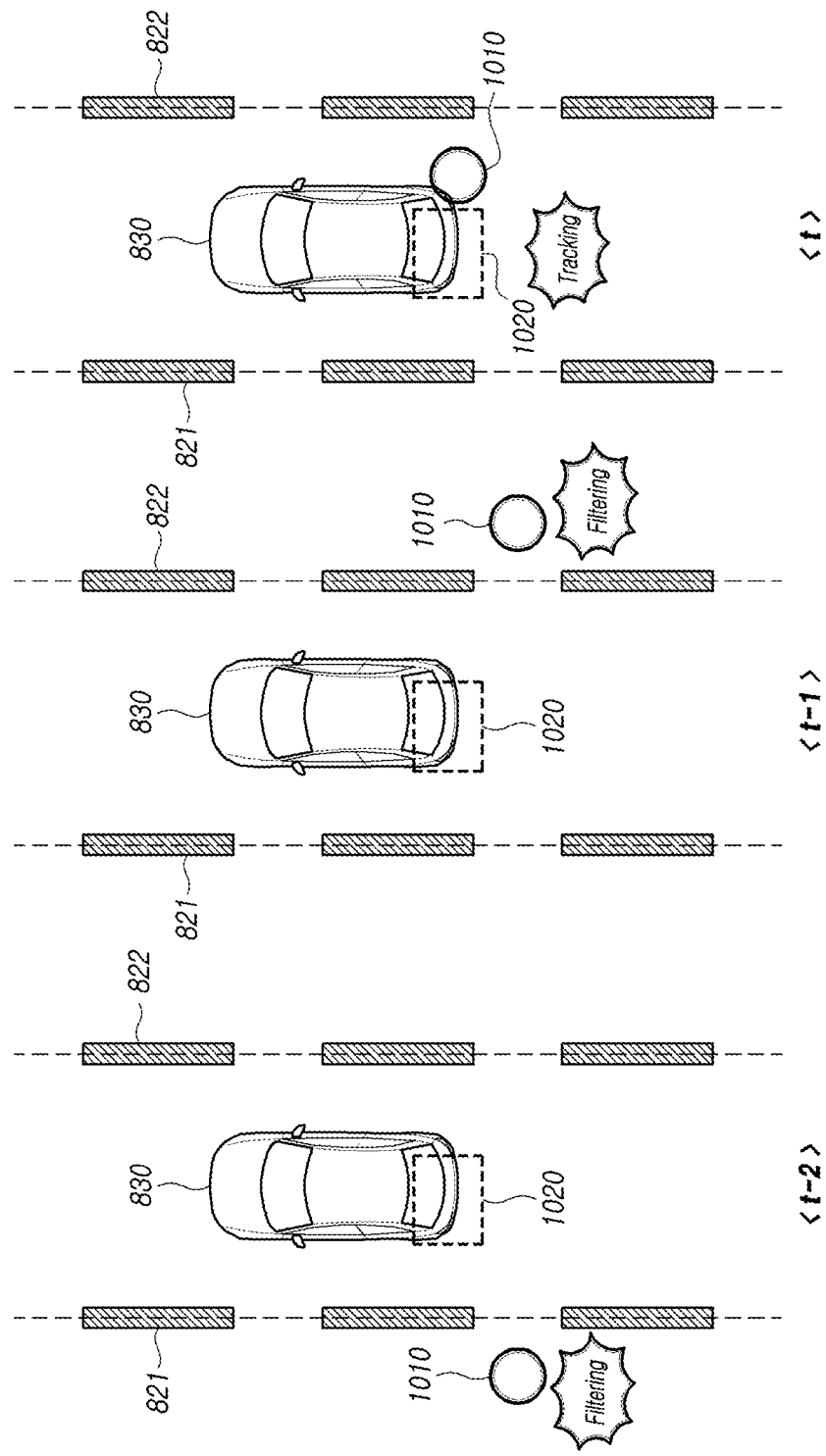
FIG. 10 is a diagram for explaining an embodiment of selecting the control target according to the present disclosure.

FIG. 10 is a diagram for explaining an embodiment of selecting the control target 910 according to the present disclosure.

Referring to FIG. 10, the control target selection unit 320 basically generates the sample measurement value 1010 of the object including the preceding target 830 every sampling time, and tracks the sample measurement value 1010 using the tracking model 1020.

At this time, the control target selection unit 320 determines whether the sample measurement value 1010 is located in the driving route 820 or the lanes 821 and 822. Hereinafter, for convenience of description, description will be made based on the lanes 821 and 822.

If the sample measurement value 1010 generated at the <t−2> sampling time exists outside the first lane 821, the control target selection unit 320 may filter the sample measurement value 1010 located outside the first lane 821, as described above with reference to FIGS. 4 and 5.

Similarly, if the sample measurement value 1010 generated at the <t−1> sampling time exists outside the second lane 822, the control target selection unit 320 may filter the sample measurement value 1010 located outside the second lane 822.

If the sample measurement value 1010 generated at the <t> sampling time exists within the second lane 822, the control target selection unit 320 may track the sample measurement value 1010 using the tracking model 1020.

If the sample measurement value 1010 and the tracking model 1020 overlap more than the preset reference range for the preset reference time after the <t> sampling time, the control target selection unit 320 may select the object corresponding to the sample measurement value 1010 as the control target 910.

Figure 11:
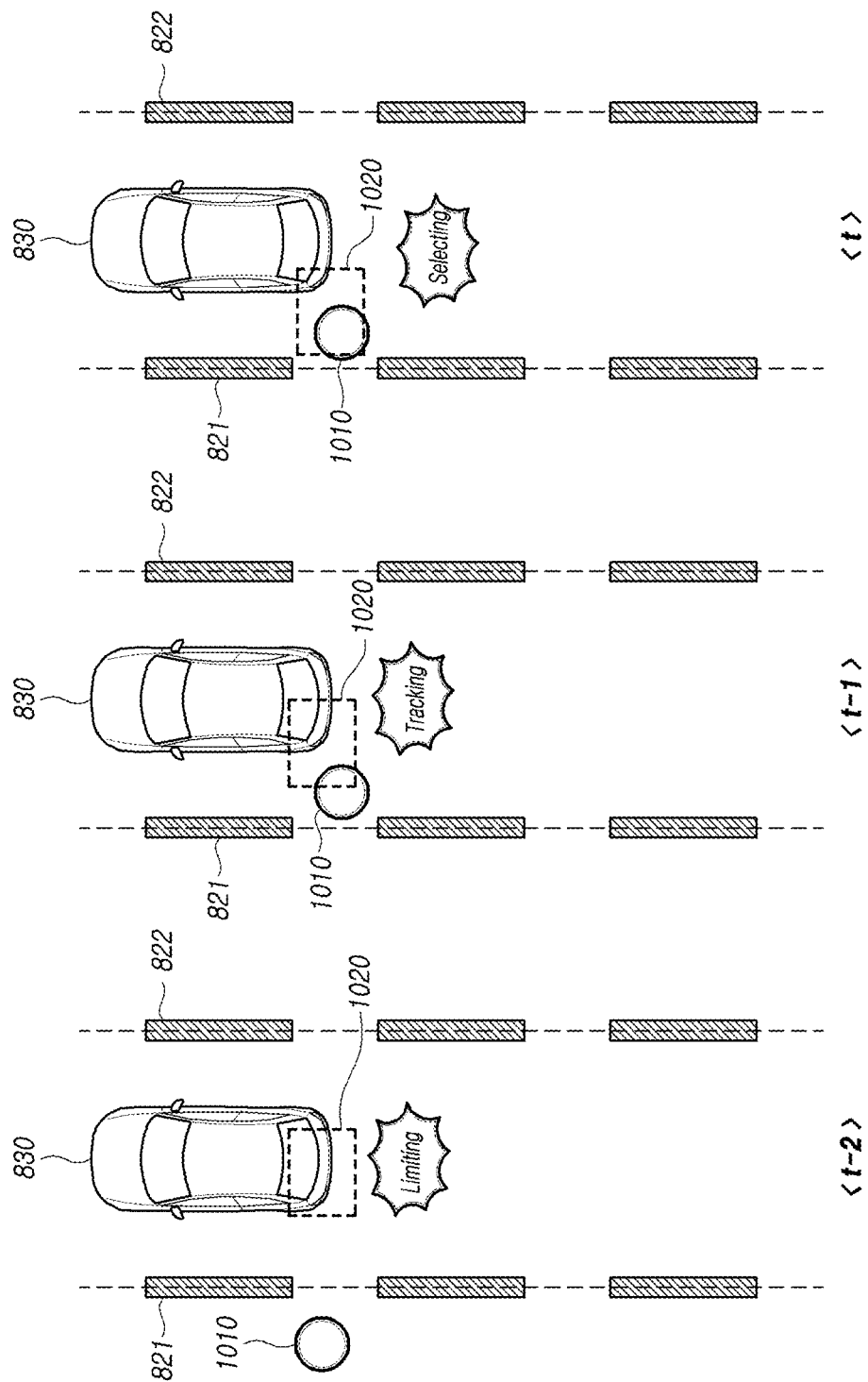
FIG. 11 is a diagram for explaining another embodiment of selecting the control target according to the present disclosure.

FIG. 11 is a diagram for explaining another embodiment of selecting the control target according to the present disclosure.

Referring to FIG. 11, the control target selection unit 320 generates the sample measurement value 1010 every sampling time and tracks the sample measurement value 1010 using the tracking model 1020 as described above with reference to FIG. 10.

If the sample measurement value 1010 generated at the <t−2> sampling time exists outside the first lane 821, the control target selection unit 320 may limit the tracking of the tracking model 1020 so that the tracking model 1020 cannot track the sample measurement value 1010 as described above with reference to FIGS. 6 and 7. That is, the control target selection unit 320 may determine the weight in the correction part as a value of 0 or more and less than 1, and may reflect the determined weight in the parameter to calculate the update estimation value.

If the sample measurement value 1010 generated at the <t−1> sampling time exists within the first lane 821, the control target selection unit 320 may update the tracking model 1020 to track the sample measurement value 1010. That is, the control target selection unit 320 may determine the weight of 1 in the correction part, and may reflect the determined weight in the parameter to calculate the update estimation value.

If the sample measurement value 1010 and the tracking model 1020 overlap more than the reference range for the reference time after the <t> sampling time, the control target selection unit 320 may select the object corresponding to the sample measurement value 1010 as the control target 910.

Hereinafter, the method of processing sensing data of the non-image sensor 120 capable of performing the present disclosure will be described.

Figure 12:
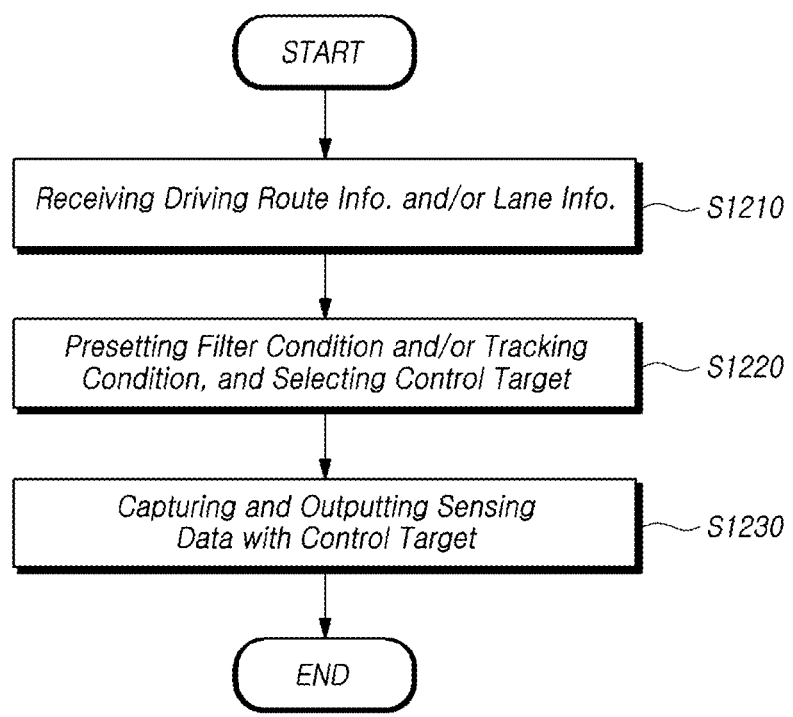
FIG. 12 is a flowchart illustrating the sensing data processing method according to the present disclosure.

FIG. 12 is a flowchart illustrating the sensing data processing method according to the present disclosure.

Referring to FIG. 12, the sensing data processing method according to the present disclosure may include the steps of receiving at least one of the driving route information and the lane information of the vehicle (S1210), and the step of presetting at least one of the filter condition and the tracking condition based on the received information and selecting the control target among one or more objects existing in front of the vehicle based on at least one of the filter condition and the tracking condition (S1220), and the step of capturing and outputting sensing data including the selected control target (S1230).

As described above, according to the present disclosure, it is possible to provide the vehicle control system, sensing device, and sensing data processing method capable of continuously selecting and maintaining targets existing on the driving route of the vehicle or controlling not to select other targets driving on the adjacent road.

In addition, according to the present disclosure, it is possible to provide the vehicle control system, sensing device, and sensing data processing method capable of accurately recognizing the preceding target existing in the driving lane of the vehicle as the control target.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A sensing device comprising a processor configured to:
   receive at least one of information of a driving route of a vehicle and information of a driving lane of the vehicle from a camera sensor;
   set at least one of a filter condition and a tracking condition based on the received at least one of the information of the driving route of the vehicle and the information of the driving lane of the vehicle, and select a control target among one or more objects existing in front of the vehicle based on at least one of the filter condition and the tracking condition; and
   output sensing data including a control target information for the control target.

2. The sensing device of claim 1, wherein the processor is configured to:
   generate a sample measurement value of the object,
   determine whether the sample measurement value is located in the driving route or a driving lane according to the filter condition,
   filter the sample measurement value located outside the driving route or the driving lane, and
   select the sample measurement value located within the driving route or the driving lane as the control target.

3. The sensing device of claim 1, wherein the processor is configured to:
   generate a tracking model movable to track a sample measurement value of the object,
   update the tracking model for tracking the sample measurement value according to whether the sample measurement value exists in the driving route or the driving lane, and
   select the object corresponding to the sample measurement value as the control target if the sample measurement value and the tracking model overlap more than a preset reference range for a preset reference time.

4. The sensing device of claim 3, wherein the processor is configured to:
   update the tracking model to track the sample measurement value if the sample measurement value is within the driving route or the driving lane, and
   release the tracking of the tracking model for the sample measurement value or limits the degree of update of the tracking model if the sample measurement value exists outside the driving route or the driving lane.

5. The sensing device of claim 1, wherein the processor is configured to:
   generate a parameter by multiplying a update gain and a correction value calculated as a difference between the sample measurement value of the object and a current estimation value in a current state of the object,
   calculate an update estimation value by updating the current estimation value by reflecting the parameter in the current estimation value,
   select the object corresponding to a first update estimation value calculated by reflecting a weight of 1 to the parameter as the control target if the sample measurement value exists in the driving route or the driving lane, and
   exclude the object corresponding to a second update estimation value calculated by reflecting the weight of 0 or more and less than 1 to the parameter from the control target if the sample measurement value exists outside the driving route or the driving lane.

6. The sensing device of claim 1, wherein the update gain is at least one of a Kalman gain by a Kalman filter or an alpha-beta gain by an alpha-beta filter.

7. The sensing device of claim 1, wherein the filter condition comprises one or more conditions for removing or filtering one or more measurement values of one or more objects located outside the driving route of the vehicle or the driving lane of the vehicle, and the tracking condition comprises one or more conditions for updating one or more measurement values of one or more objects located in the driving route or the driving lane of the vehicle.

8. A vehicle control system comprising:
a first sensor disposed in a vehicle to have a field of view for inside or outside of the vehicle, the first sensor configured to capture image data and process the captured image data;
at least one second sensor disposed in the vehicle to have a detection area for the inside or outside of the vehicle, the second sensor configured to capture sensing data and process the captured sensing data; and
a controller configured to:
recognize a control target existing in front of the vehicle as a preceding target based at least in part on the processing of the image data and the sensing data,
wherein the first sensor is configured to output at least one of information of a driving route of the vehicle and information of a driving lane of the vehicle, included in a result of the processing of the image data, to the second sensor,
wherein the second sensor is configured to receive at least one of the information of the driving route of the vehicle and the information of the driving lane of the vehicle;
set at least one of a filter condition and a tracking condition based on the received at least one of the information of the driving route of the vehicle and the information of the driving lane of the vehicle, and select a control target among one or more objects existing in front of the vehicle based on at least one of the filter condition and the tracking condition; and
output the sensing data including a control target information for the control target.

9. The vehicle control system of claim 8, wherein the controller is configured to:
generate a sample measurement value of the object,
determine whether the sample measurement value is located in the driving route or a driving lane according to the filter condition,
filter the sample measurement value located outside the driving route or the driving lane, and
select the sample measurement value located within the driving route or the driving lane as the control target.

10. The vehicle control system of claim 8, wherein the controller is configured to:
generate a tracking model movable to track the sample measurement value of the object,
update the tracking model for tracking the sample measurement value according to whether the sample measurement value exists in the driving route or the driving lane, and
select the object corresponding to the sample measurement value as the control target if the sample measurement value and the tracking model overlap more than a preset reference range for a preset reference time.

11. The vehicle control system of claim 8, wherein the controller is configured to:
generate a parameter by multiplying a update gain and a correction value calculated as a difference between the sample measurement value of the object and a current estimation value in a current state of the object,
calculate an update estimation value by updating the current estimation value by reflecting the parameter in the current estimation value,
select the object corresponding to a first update estimation value calculated by reflecting a weight of 1 to the parameter as the control target if the sample measurement value exists in the driving route or the driving lane, and
exclude the object corresponding to a second update estimation value calculated by reflecting the weight of 0 or more and less than 1 to the parameter from the control target if the sample measurement value exists outside the driving route or the driving lane.

12. The vehicle control system of claim 8, wherein the filter condition comprises one or more conditions for removing or filtering one or more measurement values of one or more objects located outside the driving route of the vehicle or the driving lane of the vehicle, and the tracking condition comprises one or more conditions for updating one or more measurement values of one or more objects located in the driving route or the driving lane of the vehicle.

13. A sensing data processing method comprising:
receiving at least one of information of a driving route of a vehicle and a information of a driving lane of the vehicle from a camera sensor;
setting at least one of a filter condition and a tracking condition based on the received at least one of the information of the driving route of the vehicle and the information of the driving lane of the vehicle, and selecting a control target among one or more objects existing in front of the vehicle based on at least one of the filter condition and the tracking condition; and
outputting sensing data including a control target information for the control target.

14. The sensing data processing method of claim 13, wherein the selecting of the control target comprises:
generating a sample measurement value of the object,
determining whether the sample measurement value is located in the driving route or a driving lane according to the filter condition,
filtering the sample measurement value located outside the driving route or the driving lane, and
selecting the sample measurement value located within the driving route or the driving lane as the control target.

15. The sensing data processing method of claim 13, wherein the selecting of the control target comprises:
generating a tracking model movable to track the sample measurement value of the object,
updating the tracking model for tracking the sample measurement value according to whether the sample measurement value exists in the driving route or the driving lane, and
selecting the object corresponding to the sample measurement value as the control target if the sample measurement value and the tracking model overlap more than a preset reference range for a preset reference time.

16. The sensing data processing method of claim 15, wherein the selecting of the control target comprises:
updating the tracking model to track the sample measurement value if the sample measurement value is within the driving route or the driving lane, and
releasing the tracking of the tracking model for the sample measurement value or limiting the degree of update of the tracking model if the sample measurement value exists outside the driving route or the driving lane.

17. The sensing data processing method of claim 13, wherein the selecting of the control target comprises:
   generating a parameter by multiplying a update gain and a correction value calculated as a difference between the sample measurement value of the object and a current estimation value in a current state of the object,
   calculating an update estimation value by updating the current estimation value by reflecting the parameter in the current estimation value,
   selecting the object corresponding to a first update estimation value calculated by reflecting a weight of 1 to the parameter as the control target if the sample measurement value exists in the driving route or the driving lane, and
   excluding the object corresponding to a second update estimation value calculated by reflecting the weight of 0 or more and less than 1 to the parameter from the control target if the sample measurement value exists outside the driving route or the driving lane.

18. The sensing data processing method of claim 17, wherein the update gain is at least one of a Kalman gain by a Kalman filter or an alpha-beta gain by an alpha-beta filter.

19. The sensing data processing method of claim 13, wherein the filter condition comprises one or more conditions for removing or filtering one or more measurement values of one or more objects located outside the driving route of the vehicle or the driving lane of the vehicle, and the tracking condition comprises one or more conditions for updating one or more measurement values of one or more objects located in the driving route or the driving lane of the vehicle.

* * * * *